United States Patent [19]

Sherman

[11] Patent Number: 5,382,766
[45] Date of Patent: Jan. 17, 1995

[54] SHOCK RESISTANT SWITCH MOUNTING

[75] Inventor: Jeffrey Sherman, St. Louis, Mo.

[73] Assignee: Emerson Electric Co., St. Louis, Mo.

[21] Appl. No.: 98,849

[22] Filed: Jul. 29, 1993

[51] Int. Cl.$^6$ .............................................. A01H 13/04
[52] U.S. Cl. .................................. 200/296; 200/543
[58] Field of Search ................................ 200/296, 543

[56] References Cited

U.S. PATENT DOCUMENTS

| | | | |
|---|---|---|---|
| 1,930,444 | 10/1933 | Popp | 200/543 |
| 2,143,158 | 1/1939 | Lefkowitz | 200/296 X |
| 4,499,352 | 2/1985 | Fujita et al. | 200/296 |

FOREIGN PATENT DOCUMENTS 294853  11/1967  Australia ................ 200/296

Primary Examiner—Ernest G. Cusick
Attorney, Agent, or Firm—Polster, Lieder, Woodruff & Lucchesi

[57] ABSTRACT

A shock resistant switch mounting includes a hollow bushing which extends through a switch housing of an electric fan, for example. A switch having a pull cord is secured to the bushing within the housing. The the pull cord extends through the bushing to be accessible outside of the housing so that the fan may be operated.

11 Claims, 1 Drawing Sheet

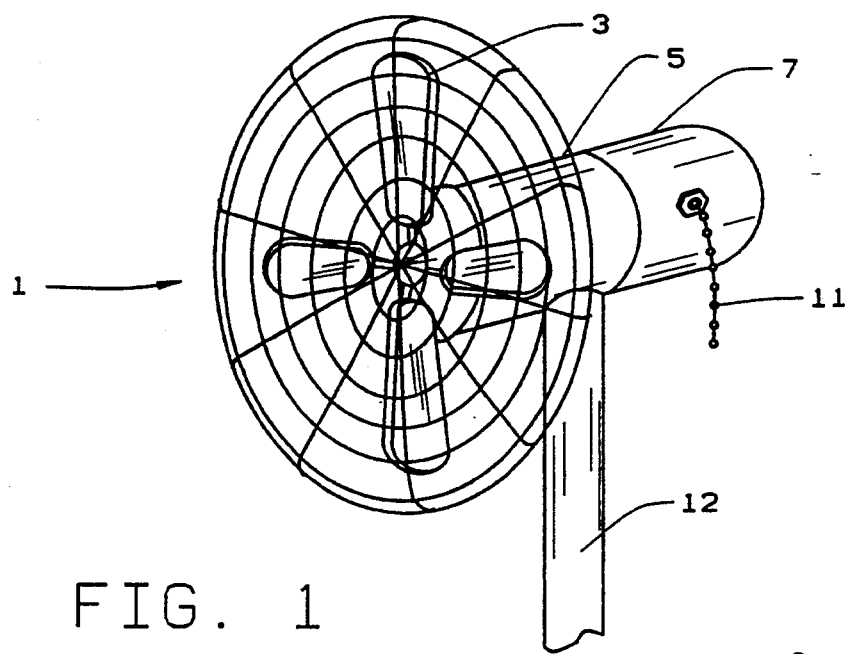
FIG. 1
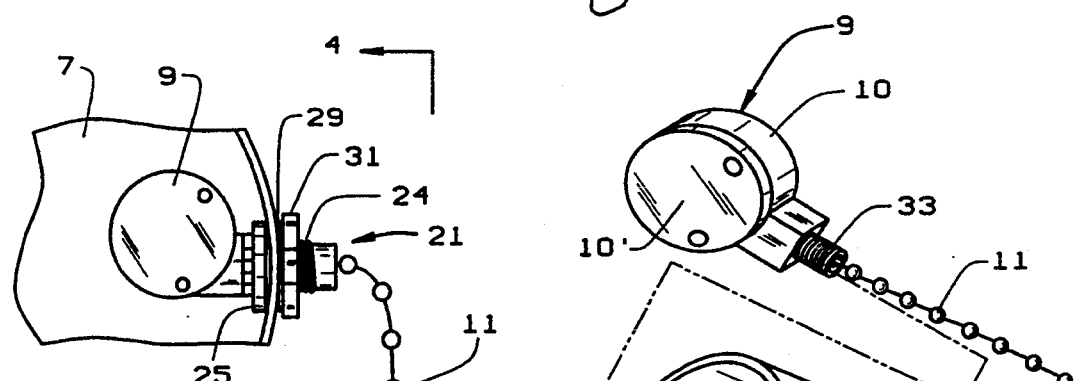
FIG. 2
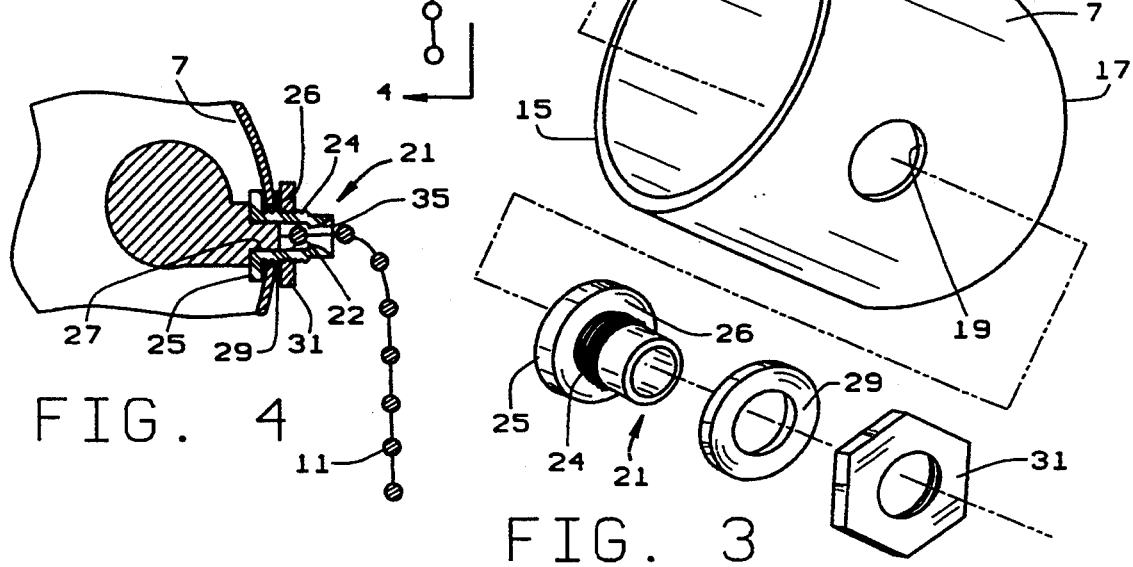
FIG. 4
FIG. 3

SHOCK RESISTANT SWITCH MOUNTING

BACKGROUND OF THE INVENTION

This invention relates to appliance mounted switches, such as switches for fans, and in particular, to a shock resistant mounting for the switch.

Switches which use pull cords are often employed in products such as fans to actuate the fan. These switches are often made of plastic. The switch mechanism itself generally is mounted in a switch housing. The switch housing has a threaded portion which extends through a shell of a motor. Previously, the plastic threaded portion was used to secure the switch to the shell. A switch cord extends through the shell so that the switch may be actuated. The threaded portion of the switch housing is fragile and easily broken by impacts which can occur during shipping, mishandling, etc. Because the threaded portion is used to secure the switch to the shell, if it is broken, the switch falls into the housing, making it nearly impossible to operate the fan. It is thus desirable to provide a manner of mounting such switches to fans to lessen the possibility of breaking the switch.

SUMMARY OF THE INVENTION

One object of the invention is to provide a mounting to isolate the switch assembly from forces which may break the switch enclosure.

Another object is to provide such mounting which is easily installed in a motor shell.

A third object is to provide such a mounting which is simple and economical to produce.

These and other objects will become apparent to those skilled in the art and in light of the following disclosure and accompanying drawings.

In accordance with the invention, generally stated, a shock resistant switch mounting structure is provided for mounting a plastic switch housing to a second component. In the preferred embodiment, the mounting structure includes a hollow bushing which extends through a motor housing or shell for an electric fan. A switch having a pull cord extension and associated pull cord are attached to the bushing within the housing. The pull cord extension extends through the bushing so as to be accessible outside of the housing, for actuating the fan. The bushing is internally threaded and the switch includes an externally threaded pull cord extension or nose through which the pull cord extends. The nose of the switch housing is mounted in the bushing to secure the switch housing within the shell. If the bushing is not used, the nose extends through the housing, making it subject to impacts which may break the nose. The bushing thus protects the nose of the switch from damaging impacts.

BRIEF DESCRIPTION OF THE DRAWINGS

FIG. 1 is a perspective view of a fan assembly utilizing one illustrative embodiment of switch mounting structure of the present invention;

FIG. 2 is an enlarged exploded view of the switch mounting structure shown in FIG. 1;

FIG. 3 is an exploded view in perspective of the switch mounting structure of the present invention; and FIG. 4 is a cross-sectional view taken of the switch mounted in a motor shell.

DESCRIPTION OF THE PREFERRED EMBODIMENT

A fan 1 shown in FIG. 1 has a fan blades 3 operatively connected to a motor so as to be driven thereby. The motor is shown encased by its housing 5 or shell. The shell 5 includes an end portion 7 attached to the motor shell in any convenient method. The end portion 7 is adapted to receive a switch 9. Switch 9 is conventional and commonly includes a switch housing 10 having a pull cord 11 extending outwardly from it for use by an operator to start and stop operation of the fan 1. Switch housing 10 includes a main body part 10' having a size and shape designed to receive the actual switch elements used in fan operation. While a generally circular or cylindrical body 10' is illustrated, no particular size or shape is required. A cord extension projection or nose 33 extends outwardly from the body 10. Nose 33 has an axial opening in it which communicates with the interior volume defined by the main body part, and in particular with the switch structure mounted therein. A pull chain 11 is connected to that switch structure and extends through the opening. Housing 10 is mounted to the end portion 7 of motor shell 5 to facilitate connection of the switch 9 to the circuitry of the motor. Fan 1 is shown mounted on a stand 12. Fan 1 may comprise any of a variety of products commercially available, including, for example, an oscillating fan. Although the present invention is shown to be incorporated into an oscillating fan, those skilled in the art will appreciate the wider applicability of the present invention.

End portion 7 has a cylindrical body defined by a wall 13, which is open at an end 15 for attachment to fan 1 and closed at end 17 in a semi-spherical shape. Although this form is shown and preferred, any number of other configurations could be used in connection with the switch 9.

Wall 13 has an opening 19 formed in it. Opening 19 is sized to receive a bushing 21. Bushing 21 is hollow, defining a bore 22 which is threaded along its external wall, as at 24. A cap 25 is formed at an end of bushing 21 and is positioned against the inside of wall 13 along a shoulder 26 in the intermounted portion of the bushing 21. Bushing 21 also is threaded along an internal wall, as at 27. The axial length of bushing 21 outboard of shoulder 26 is chosen so that at least a portion of the threads 27 extend through opening 19. A washer 29 is mounted on bushing 21, outboard of wall 13. A nut 31 also is threaded intermounted on bushing 21 to secure bushing 21 to end portion 7 of housing 5.

Switch 9 has a hollow externally threaded projection 33 from which cord 11 extends. Projection 33 is screwed into bore 22 of bushing 21. Bushing 21 thus secures or mounts switch 9 in housing 5. Cord 11 extends through bushing bore 22 so as to be readily accessible for fan operation. The outer end of bore 22 is flared or chamfered, as at 35, so as to present cord 11 with a smooth surface for sliding operation. Cord 11 is thus not pulled over any sharp corners to operate fan 1.

Switch 9 and its projection 33 are generally made from plastic which may be easily broken. Bushing 21 is made from a strong, impact resistant material which will protect projection 33 from undue forces which may break it. As can be seen, the use of bushing 21 provides an inexpensive and simple device for securing a switch to a fan and for protecting the fan switch.

The foregoing description is set forth for illustrative purposes only. Variations, within the scope of the appended claims, will be apparent to those skilled in the art. For example, rather than securing bushing 21 to housing 7 with a nut, an internally threaded tube may be welded to housing 7 to replace the bushing. Bushing 21, or this tube, could be secured to housing 7 in a manner such that nothing extends out of housing 7, other than cord 11, so that the outer surface will be smooth. These examples are merely illustrative.

I claim:

1. A shock resistant switch mounting for a product having a switch housing defining an opening; the mounting including a hollow bushing secured to said housing and a switch having a switch body and a pull cord extending from said body; said bushing being coaxial with and extending through said housing opening, said bushing having a cap formed at an end of said bushing to be positioned against an inner surface of said housing around said opening; said body being at least partially received in and secured to said bushing, said pull cord passing through said bushing to be accessible to operate said switch; whereby said bushing isolates said switch from potentially damaging impacts.

2. The shock resistant switch mounting of claim 1 wherein said bushing is internally threaded, said switch body having an externally threaded nose from which said pull cord externally extends, said switch body being threadably secured to said bushing by said nose.

3. The shock resistant switch mounting of claim 2 wherein said bushing defines a bore through which said cord extends, said bore having an outer end having a rounded surface over which said pull cord passes.

4. The shock resistant switch mounting of claim 3 wherein said bushing extends through said housing; said bushing being externally threaded along a portion thereof externally of said housing, said externally threaded portion receiving a fastener to secure said bushing to said housing.

5. The shock resistant switch mounting of claim 4 wherein said external threads of said bushing extend through said opening, said fastener being threaded onto said bushing external threads to butt against an outer surface of said housing.

6. The shock resistant switch mounting of claim 1 wherein said bushing is made from an impact resistant material.

7. In combination with an electric fan having a motor which drives the fan, a shell encasing the motor, a switch housing adjacent said motor shell, and a switch mounted in said housing in a shock resistant switch mounting, said switch having a body, a nose extending therefrom, and a pull cord extending from said nose to operate said switch, said shell having an opening through which said pull cord extends; said switch mounting including a bushing coaxial with and extending through said opening; said switch nose being received in said bushing; said pull cord extending through said bushing, said bushing isolating said switch from potentially damaging impacts.

8. The combination of claim 5 wherein said bushing is at least partially internally threaded and said switch nose is externally threaded, said nose being threadably secured into said bushing.

9. The combination of claim 8 wherein said bushing defines a bore through which said cord extends, said bore having an outer end having a rounded surface over which said pull cord passes.

10. The combination of claim 9 wherein said bushing is externally threaded, said external threads being exposed externally of said shell, said bushing threadably receiving a fastener to secure said bushing to said shell.

11. The combination of claim 10 wherein said switch mounting is made of an impact resistant material.

* * * * *